(12) United States Patent
Tamir et al.

(10) Patent No.: US 7,455,420 B2
(45) Date of Patent: Nov. 25, 2008

(54) ILLUMINATING DEVICE

(76) Inventors: Giora Tamir, 36 King Arthur Ct., New City, NY (US) 10956; Tali Tamir, 17 Hagdud Malvri St., Avilnayil (IL); Baruch Tamir, 1 Apline Ct., Chestnut Ridge, NY (US) 10977

( * ) Notice: Subject to any disclaimer, the term of this patent is extended or adjusted under 35 U.S.C. 154(b) by 0 days.

(21) Appl. No.: 11/709,379

(22) Filed: Feb. 22, 2007

(65) Prior Publication Data
US 2008/0205051 A1   Aug. 28, 2008

(51) Int. Cl.
*F21L 4/04* (2006.01)
(52) U.S. Cl. .................. 362/201; 362/208; 362/250
(58) Field of Classification Search ............... 362/200, 362/201, 208, 109, 135, 136, 125, 253, 249, 362/250, 251; 40/580, 502, 541, 480
See application file for complete search history.

(56) References Cited

U.S. PATENT DOCUMENTS

| | | | | |
|---|---|---|---|---|
| 1,404,362 A * | 1/1922 | Goodfellow | ............... | 362/196 |
| 2,879,379 A * | 3/1959 | Lyons | ............... | 362/141 |
| 3,049,045 A * | 8/1962 | Miller et al. | ............... | 359/441 |
| 4,250,539 A * | 2/1981 | Leitzel et al. | ............... | 362/196 |
| 5,133,327 A * | 7/1992 | Hirosawa et al. | ............... | 123/564 |
| 5,642,234 A * | 6/1997 | Altman et al. | ............... | 359/802 |
| 6,454,435 B1 * | 9/2002 | Altman | ............... | 362/200 |
| 6,508,569 B2 * | 1/2003 | Krietzman et al. | ............... | 362/201 |
| 2002/0105799 A1 * | 8/2002 | Bliss | ............... | 362/202 |

FOREIGN PATENT DOCUMENTS

GB   1547728 A * 6/1979

* cited by examiner

*Primary Examiner*—John A Ward
(74) *Attorney, Agent, or Firm*—Kirschstein, et al.

(57) ABSTRACT

An illuminating device serves as a flashlight in one mode of operation, and as an illuminated magnifier in another mode of operation.

11 Claims, 5 Drawing Sheets

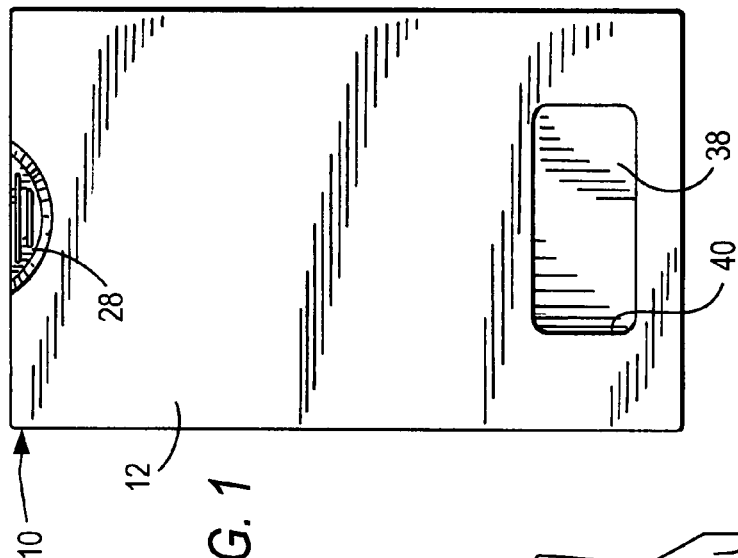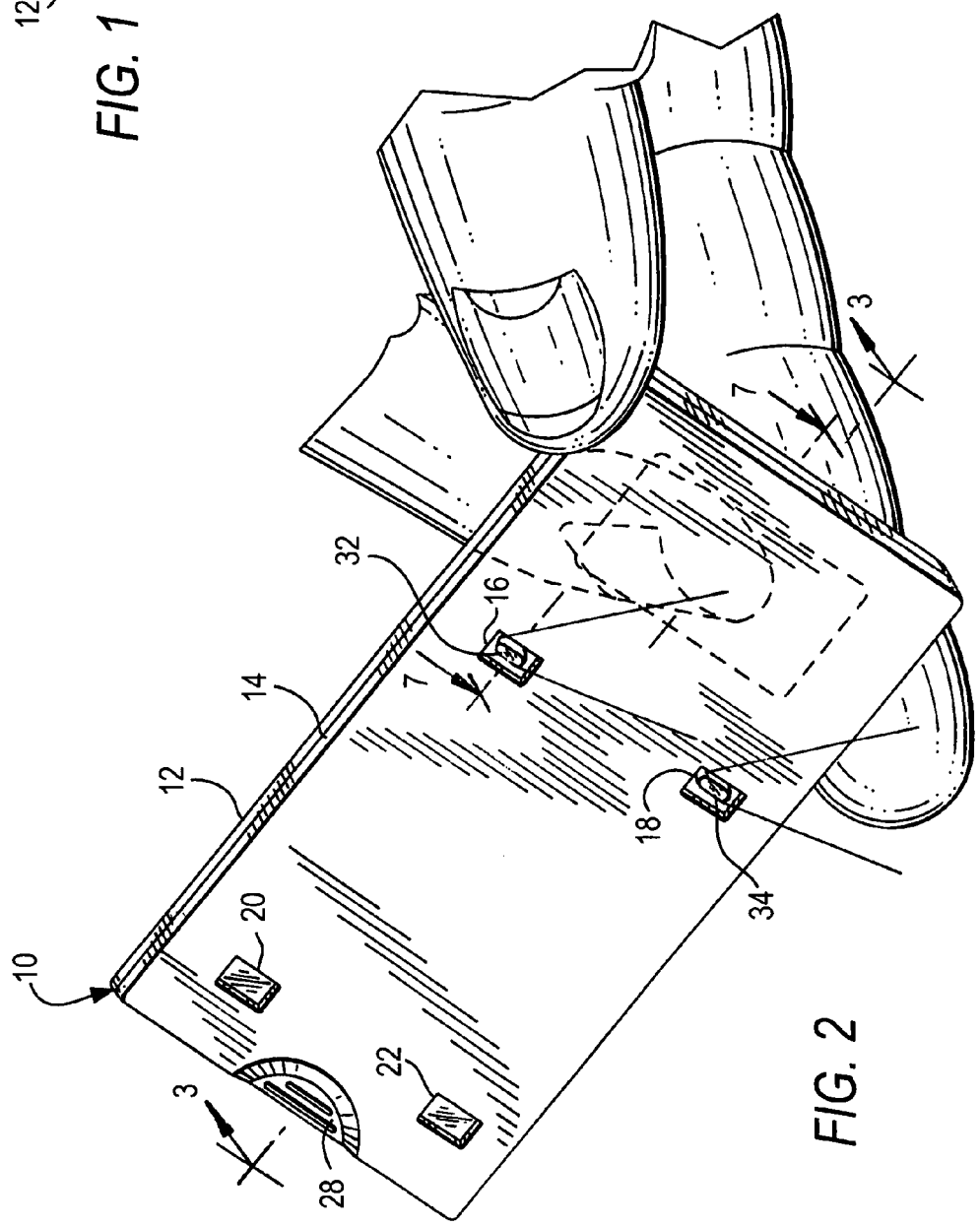

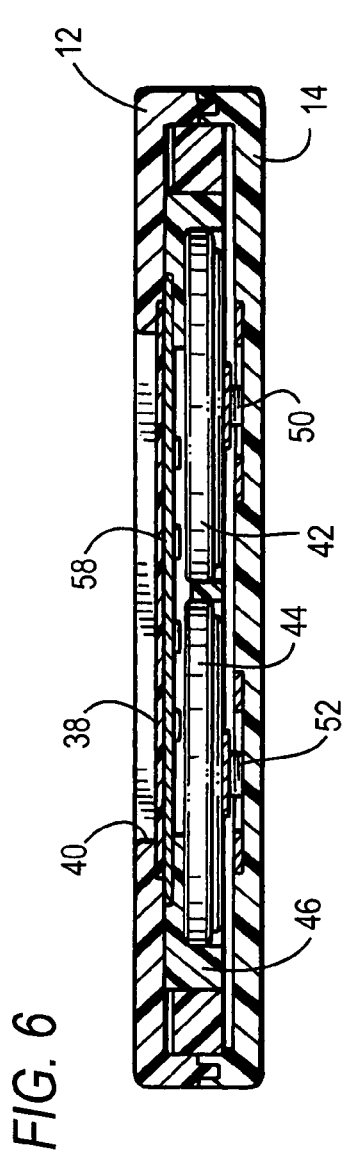
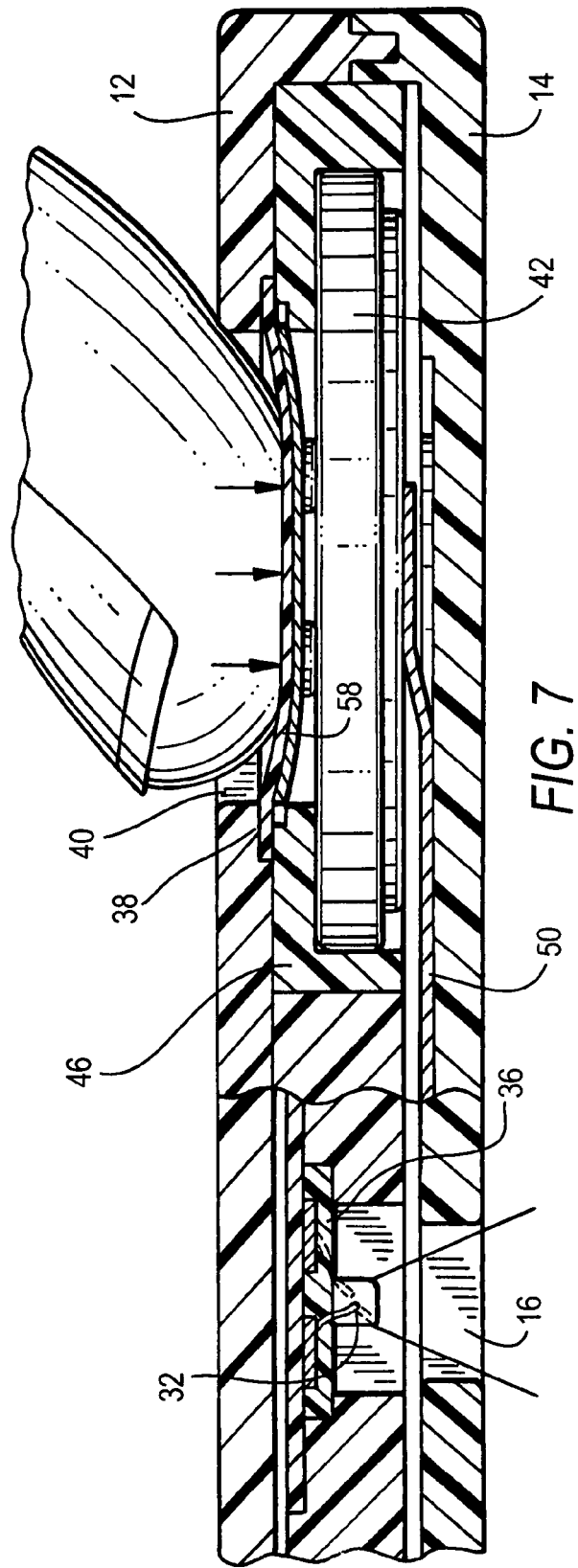
FIG. 6
FIG. 7

ILLUMINATING DEVICE

BACKGROUND OF THE INVENTION

This invention generally relates to an illuminating device and, more particularly, to a device that serves as a flashlight in one mode of operation, and as an illuminated magnifier in another mode of operation.

DESCRIPTION OF THE RELATED ART

Additional illumination is often required for individuals to see in darkened environments, such as restaurants with the room light turned low, or the interior of handbags. In addition to extra illumination, many visually-handicapped individuals use eyeglasses and magnifying lenses to help them see clearly. Yet, it often occurs that such additional illumination or other visual aids are not available when they are needed most.

OBJECTS OF THE INVENTION

It is an object of this invention to readily provide additional illumination as well as a visual aid to enable individuals to see more clearly.

SUMMARY OF THE INVENTION

In keeping with this object and others, which will become apparent hereinafter, one feature of this invention resides in an illuminating device which serves as a flashlight in one mode of operation, and which serves as an illuminated magnifier in another mode of operation.

The device comprises a sheath having apertures spaced apart along a longitudinal direction; and a slide member mounted on the sheath for movement between a retracted position in which the slide member is located within the sheath, and an extended position in which the slide member extends longitudinally exteriorly of the sheath.

An energizable light is mounted on the slide member for joint sliding movement between a first position in which the light is aligned with one of the apertures in the retracted position, and a second position in which the light is aligned with another of the apertures in the extended position. An actuator on the sheath is operative for energizing the light in at least one of the first and second positions.

Preferably, a magnifying lens is provided on the slide member, with the magnifying lens being located exteriorly past the sheath in the extended position.

In the preferred embodiment, the sheath is generally rectangular and has an open end through which the slide member is moved between the retracted and extended positions. Also, the sheath has a finger notch at the open end for enabling finger access to the slide member. In addition, the sheath has an access opening through which the actuator is accessible.

Advantageously, the sheath has two pairs of the apertures, and another light mounted on the slide member. The lights are aligned with one pair of the apertures in the first position, and the lights are aligned with the other pair of the apertures in the second position.

The lights are light emitting diodes mounted on the slide member.

A pair of batteries is operative for supplying electrical energy to the lights upon actuation of the actuator. A pair of electrically conductive tracks extends in the longitudinal direction on the sheath.

In accordance with this invention, when the slide member is in the retracted position, the light emitting diodes emit their light through the one pair of apertures when the actuator is actuated, preferably by manually depressing the actuator exposed at the access opening. The magnifying lens is not exposed in the retracted position.

Alternatively, when the slide member is in the extended position, the light emitting diodes emit their light through the other pair of apertures when the actuator is actuated, preferably by again manually depressing the actuator exposed at the access opening. The magnifying lens is exposed in the extended position.

The illuminating device is of a small size and can readily fit in one's pocket or handbag, thereby enabling one to readily have the device at hand.

BRIEF DESCRIPTION OF THE DRAWINGS

FIG. 1 is a top plan view of an illuminating device according to this invention in a retracted position of a slide member;

FIG. 2 is a perspective view of the illuminating device of FIG. 1 when used in a flashlight mode;

FIG. 6 is a sectional view taken on line 6-6 of FIG. 3;

FIG. 7 is a sectional view taken on line 7-7 of FIG. 2;

DETAILED DESCRIPTION OF THE PREFERRED EMBODIMENT

Figure 8:
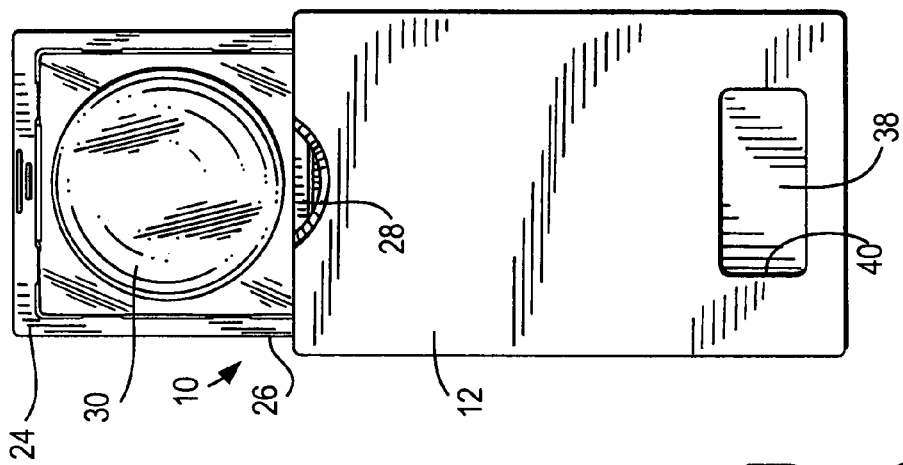
FIG. 8 is a top plan view of the illuminating device of FIG. 1 in an extended position of the slide member.
Figure 9:
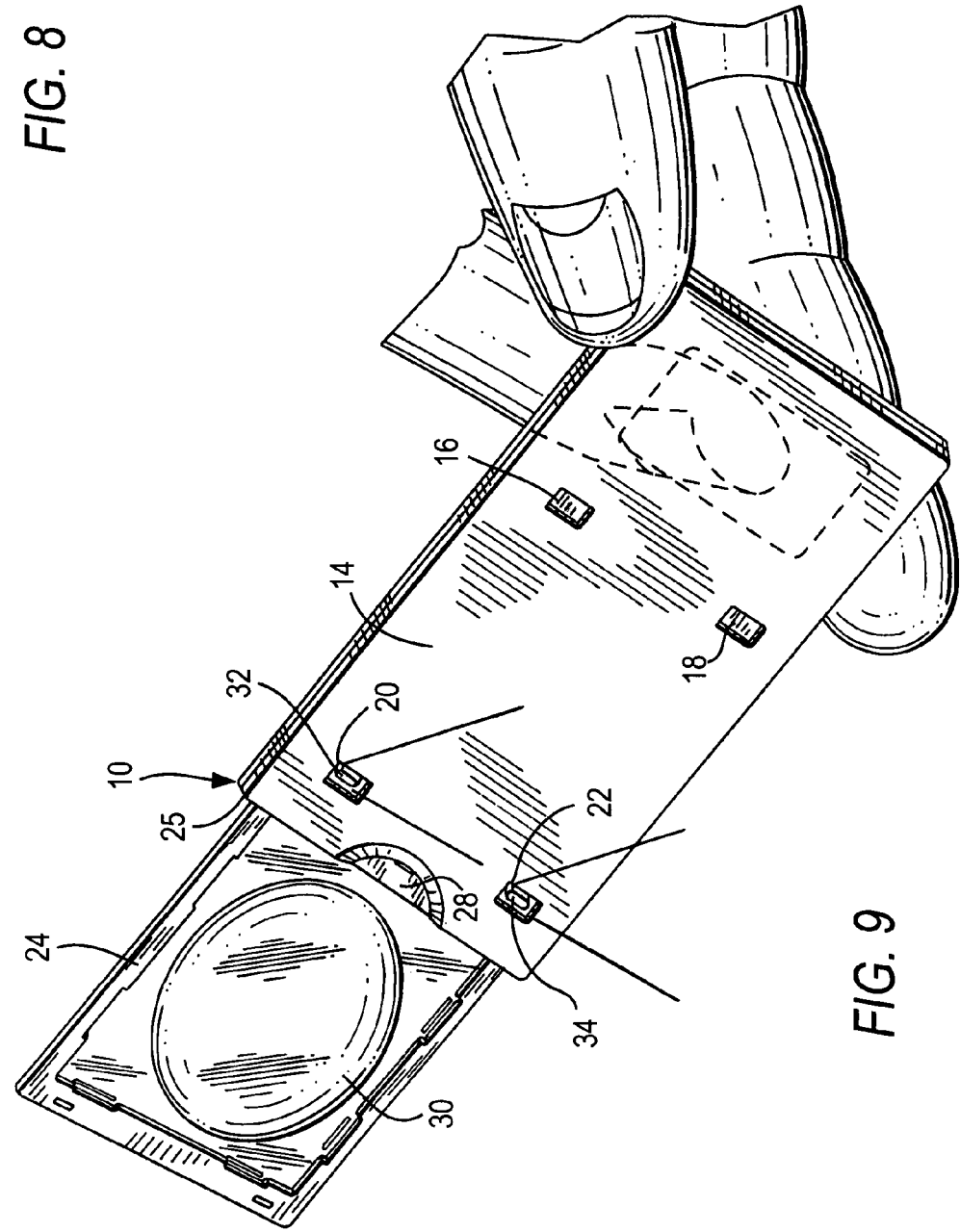
FIG. 9 is a perspective view of the illuminating device of FIG. 8 when used in an illuminated magnifying mode.

Referring now to the drawings, reference numeral 10 generally identifies an illuminating device which serves as a flashlight in one mode of operation as depicted in FIGS. 1-2, and which serves as an illuminated magnifier in another mode of operation as depicted in FIGS. 8-9.

The device comprises a sheath comprised of an upper planar housing part 12 and a lower planar housing part 14 snap mounted together. The sheath is generally rectangular and flat and is sized to fit in one's pocket or handbag. The lower housing part 14 has a first pair of apertures 16, 18 spaced apart along a longitudinal direction from a second pair of apertures 20, 22.

Figure 3:
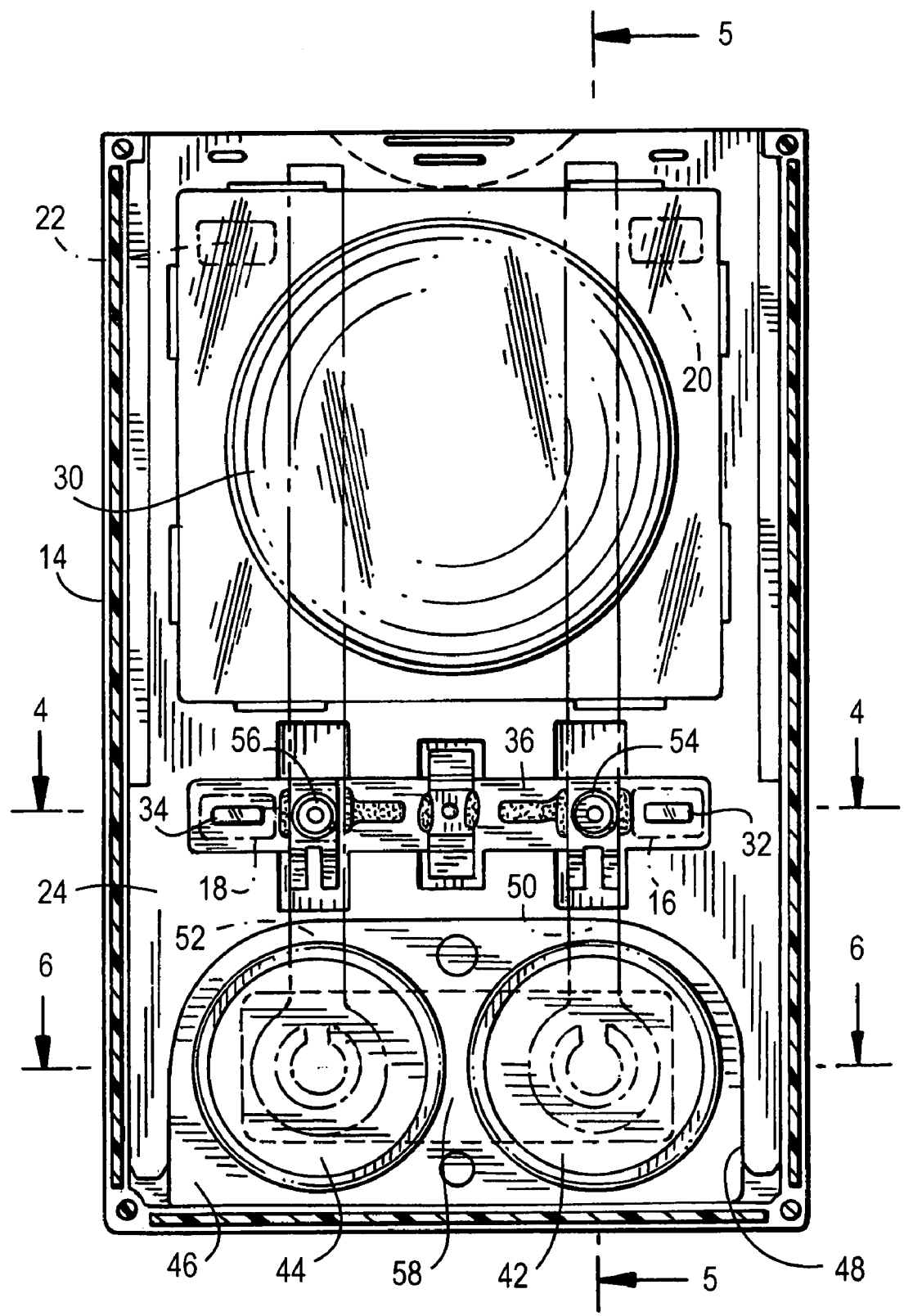
FIG. 3 is a sectional view taken on line 3-3 of FIG. 2.
Figure 4:
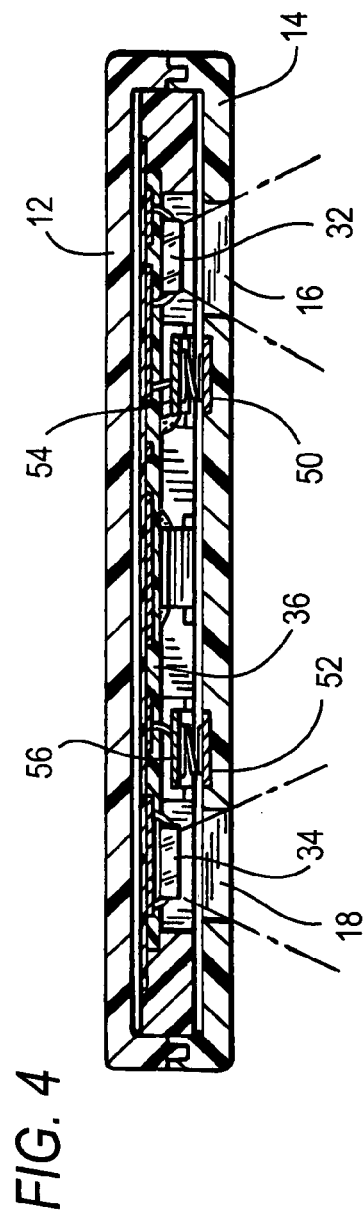
FIG. 4 is a sectional view taken on line 4-4 of FIG. 3.
Figure 5:
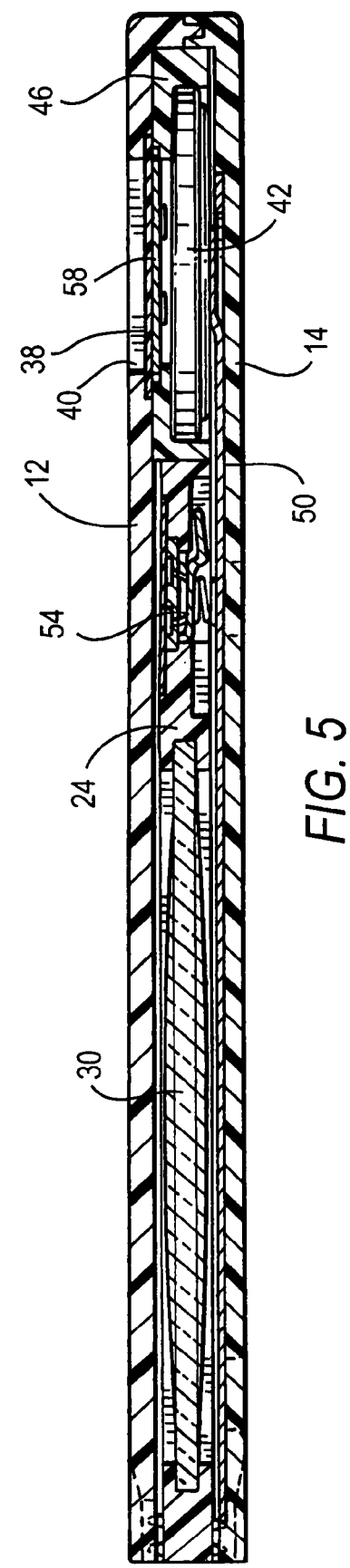
FIG. 5 is a sectional view taken on line 5-5 of FIG. 3.

As seen in FIGS. 3, 8 and 9, a generally planar slide member 24 is mounted on the sheath between the housing parts 12, 14 for sliding movement between a retracted position (FIG. 1) in which the slide member 24 is located within the sheath, and an extended position (FIG. 8) in which the slide member 24 extends longitudinally exteriorly of the sheath. The sheath has an open end 26 through which the slide member 24 is moved between the retracted and extended positions. Also, the sheath has a semi-circular finger notch 28 at the open end 26 for enabling finger access to the slide member 24.

A magnifying lens 30 is provided on the slide member 24, with the magnifying lens being located exteriorly past the sheath in the extended position, and being wholly contained within the sheath in the retracted position.

A pair of energizable lights 32, 34, preferably light emitting diodes, is surface mounted on a circuit board 36 which is in turn mounted on the slide member 24 for joint sliding movement between a first position (FIG. 2) in which the lights are aligned with the apertures 16, 18 in the retracted position, and a second position in which the lights are aligned with the apertures 20, 22 in the extended position. An electrically insulating actuator 38 on the sheath is operative for energizing the lights in either one of the first and second positions. The sheath has an access opening 40 through which the actuator 38 is accessible.

A pair of batteries 42, 44 is operative for supplying electrical energy to the lights upon actuation of the actuator 38. The batteries are mounted in a holder 46, which is mounted on the sheath. As best seen in FIG. 3, the slide member 24 has a rear U-shaped cutout 48, which prevents mechanical interference between the holder 46 and the slide member 24 in the retracted position. The holder remains stationary during movement of the slide member.

A pair of electrically conductive tracks 50, 52 extends in the longitudinal direction on the lower housing part 14. A pair of electrical slide contacts 54, 56 is mounted on the slide member in electrical communication with the lights. The contacts slide along the tracks during movement of the slide member and interconnect the batteries 42,44 and the lights 32, 34. An electrically conductive bridge member 58 overlies terminals of the batteries. The bridge member 58 is normally spaced away from the terminals. Manual pressure on the actuator, as shown in FIG. 7, presses the bridge member into electromechanical contact with the terminals.

In accordance with this invention, when the slide member 24 is in the retracted position, the light emitting diodes 32, 34 emit their light through the lower pair of apertures 32, 34 when the actuator 38 is actuated, by manually depressing the actuator exposed at the access opening 40 and pressing the bridge member 58 to interconnect the batteries 42,44 and complete an electrical circuit. The magnifying lens 30 is not exposed in the retracted position.

Alternatively, when the slide member 24 is in the extended position, the light emitting diodes 32, 34 emit their light through the upper pair of apertures 20, 22 when the actuator is actuated, by again manually depressing the actuator exposed at the access opening and pressing the bridge member 58 to interconnect the batteries 42,44 and complete an electrical circuit. The magnifying lens 30 is exposed in the extended position.

It will be understood that each of the elements described above, or two or more together, also may find a useful application in other types of constructions differing from the types described above.

While the invention has been illustrated and described as embodied in an illuminating device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An illuminating device, comprising:
   a sheath having an upper housing part, a lower housing part lying in a plane, and a plurality of apertures extending through the lower housing part in a direction perpendicular to the plane and spaced apart along a longitudinal direction;
   a slide member mounted on the sheath for sliding movement along the longitudinal direction between a retracted position in which the slide member is located within the sheath between the housing parts, and an extended position in which the slide member extends longitudinally exteriorly of the sheath;
   an energizable light source mounted on the slide member for joint sliding movement between a first position in which the light source is aligned with one of the apertures in the retracted position, and a second position in which the light source is aligned with another of the apertures in the extended position; and
   an actuator on the sheath for energizing the light source in the first position to emit light through said one aligned aperture, and for energizing the light source in the second position to emit light through said another aligned aperture.

2. The device of claim 1, wherein the sheath is generally rectangular and has an open end through which the slide member is moved between the retracted and extended positions.

3. The device of claim 2, wherein the sheath has a finger notch at the open end for enabling finger access to the slide member.

4. The device of claim 1, wherein the sheath has an access opening through which the actuator is accessible.

5. The device of claim 1, and another light source mounted on the slide member.

6. The device of claim 5, wherein the light sources are light emitting diodes mounted on the slide member.

7. The device of claim 5, and a pair of batteries operative for supplying electrical energy to the light sources upon actuation of the actuator.

8. The device of claim 7, and a pair of electrically conductive tracks extending in the longitudinal direction on the sheath.

9. The device of claim 1, and a magnifying lens on the slide member, the magnifying lens being located exteriorly past the sheath in the extended position.

10. The device of claim 7, wherein the batteries are stationarily mounted on the sheath.

11. The device of claim 6, and a printed circuit board on the slide member, and wherein the diodes are surface mounted on the board.

\* \* \* \* \*